United States Patent [19]

Kim

[11] Patent Number: 5,712,690
[45] Date of Patent: Jan. 27, 1998

[54] APPARATUS AND METHOD FOR DIAGNOSING RECEIVED BROADCAST SIGNALS USING SYNC SIGNALS AND SIGNAL LEVEL

[75] Inventor: Yoon-kil Kim, Suwon, Rep. of Korea

[73] Assignee: Samsung Electronics Co., Ltd., Kyungki-Do, Rep. of Korea

[21] Appl. No.: 470,120

[22] Filed: Jun. 6, 1995

[30] Foreign Application Priority Data

Jun. 23, 1994 [KR] Rep. of Korea ............... 94-14392

[51] Int. Cl.$^6$ ................................. H04N 5/445
[52] U.S. Cl. ............................. 348/570; 348/569
[58] Field of Search .................. 358/183, 165; 348/563, 569, 570, 632, 633, 634, 635; 455/154.1, 226.3, 226.4; H04N 5/50, 5/45, 5/445, 5/455

[56] References Cited

U.S. PATENT DOCUMENTS 4,837,623  6/1989  Motoyama ........................ 348/569

FOREIGN PATENT DOCUMENTS

| 0010980 | 1/1987 | Japan | 358/165 |
| 0234678 | 9/1988 | Japan | H04N 5/44 |
| 0121245 | 4/1994 | Japan | H04N 5/445 |
| 2221363 | 1/1990 | United Kingdom | H04N 5/50 |

*Primary Examiner*—David E. Harvey
*Attorney, Agent, or Firm*—Sughrue, Mion, Zinn, Macpeak & Seas, PLLC

[57] ABSTRACT

A broadcast state self-diagnostic apparatus and method detects a horizontal sync signal from a video signal received through an antenna, counts the number associated with the detected horizontal sync signal, compares this value with the number associated with a reference horizontal sync signal, detects the level of the video signal by using an AGC signal, and compares the detected level of the video signal with a reference level. A user can easily see that a noise is generated by the broadcast state rather than the television, itself, by displaying an OSD character showing the abnormal state of the broadcast signal according to the compared result.

6 Claims, 2 Drawing Sheets

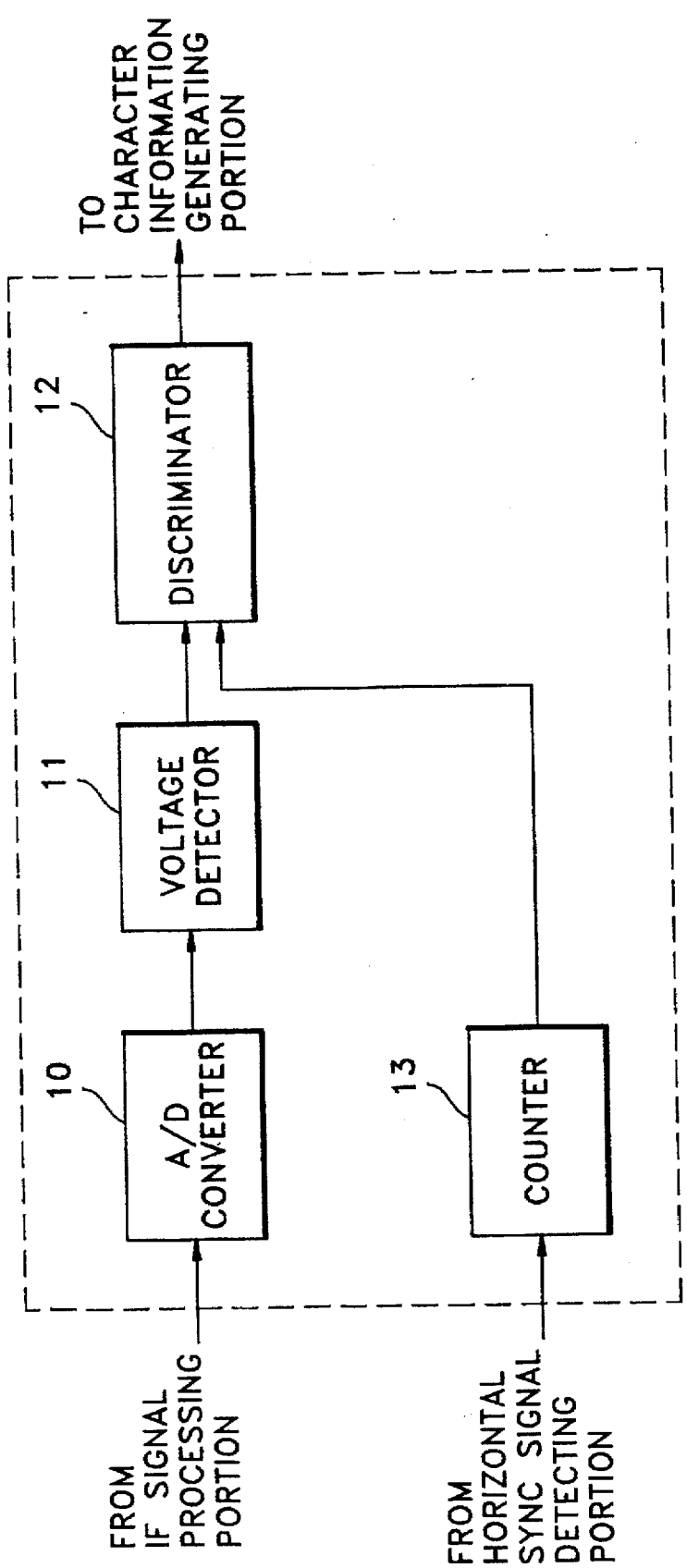

APPARATUS AND METHOD FOR DIAGNOSING RECEIVED BROADCAST SIGNALS USING SYNC SIGNALS AND SIGNAL LEVEL

BACKGROUND OF THE INVENTION

1. Field of the Invention

The present invention relates to a self-diagnosing apparatus for determining the broadcast state of a received signal and a method for such diagnosis. More particularly, the present invention relates to an apparatus and method for discriminating a broadcast state by using a horizontal synchronization signal and an automatic gain control signal of a received broadcast signal, in order to display the discriminated result on a screen.

2. Discussion of Related Art

Generally, when a broadcast signal is input to a television as a very weak signal compared with a normal state, either an antenna is out of order or the connecting part of the antenna is connected poorly, such that the television displays a noisy generated image instead of a normal image.

In such a case, a user does not know the causes of the noise on the image. Therefore, the user may be led to believe that there is some abnormality in the television itself, which results in the use of unnecessary service and resulting unnecessary expenses.

On the other hand, an apparatus for use in an image transmission apparatus, in which a received video signal and an original video signal are compared with a reference video signal generated by a pattern generator, respectively, and the compared result is diagnosed, is disclosed in U.S. Pat. No. 5,274,446. Because the image transmission apparatus uses an extra pattern generator, a resulting additional cost is associated therewith. This is avoided by the present invention.

SUMMARY OF THE INVENTION

Accordingly, it is an object of the present invention to provide a broadcast state self-diagnostic apparatus, using a horizontal sync signal and an automatic gain control signal of a broadcast signal without having an extra diagnosing circuit in the broadcast receiving apparatus.

It is another object of the present invention to provide a broadcast state self-diagnostic method for on-screen display, such that if the input broadcast signal is weak, a user is informed that generated noise is caused from the broadcast state by comparing the counted number of pulses of a horizontal sync signal of an input broadcast signal with the number of pulses of a reference horizontal sync signal, or by checking an automatic gain control signal.

To achieve the above object, a broadcast state self-diagnostic apparatus according to the present invention includes the following: (1) A tuning means outputs an intermediate frequency (IF) signal by tuning a broadcast signal of an externally input radio frequency as a signal of a desired broadcast channel. (2) A first detecting means detects only video signals from the IF signal supplied from the tuning means. (3) A second detecting means detects a horizontal sync signal from the detected video signal; (4) A control means compares a level of the detected video signal and the detected horizontal sync signal with reference values respectively and outputs a control signal based upon the comparison result: (5) A character information generating means generates character information according to a control signal indicating that the broadcast signal is abnormal and displays the generated character information.

A broadcast state self-diagnostic method of the present invention for diagnosing a state of a broadcast signal by tuning an externally supplied broadcast signal, and receiving a video signal of a desired channel, includes the following. (1) A first detection step involves detecting the horizontal sync signal from the video signal. (2) A first comparison step involves comparing the number of pulses of the detected horizontal sync signal with the number of the reference horizontal sync signal. (3) A second detection step involves detecting the level of the video signal. (4) A second comparison step involves comparing the detected video level with a reference level. (5) A control signal generation step involves generating a control signal if the compared result indicates a difference in either of the comparison steps. (6) A step of generating character information involves showing the abnormal state of the broadcast signal according to the control signal and displaying the generated character information.

BRIEF DESCRIPTION OF THE DRAWINGS

The above objects and advantages of the present invention will become more apparent by describing in detail a preferred embodiment thereof with reference to the attached drawings in which:

FIG. 2 is a detailed block diagram of the microcomputer shown in FIG. 1.

DETAILED DESCRIPTION OF THE PREFERRED EMBODIMENT

Figure 1:
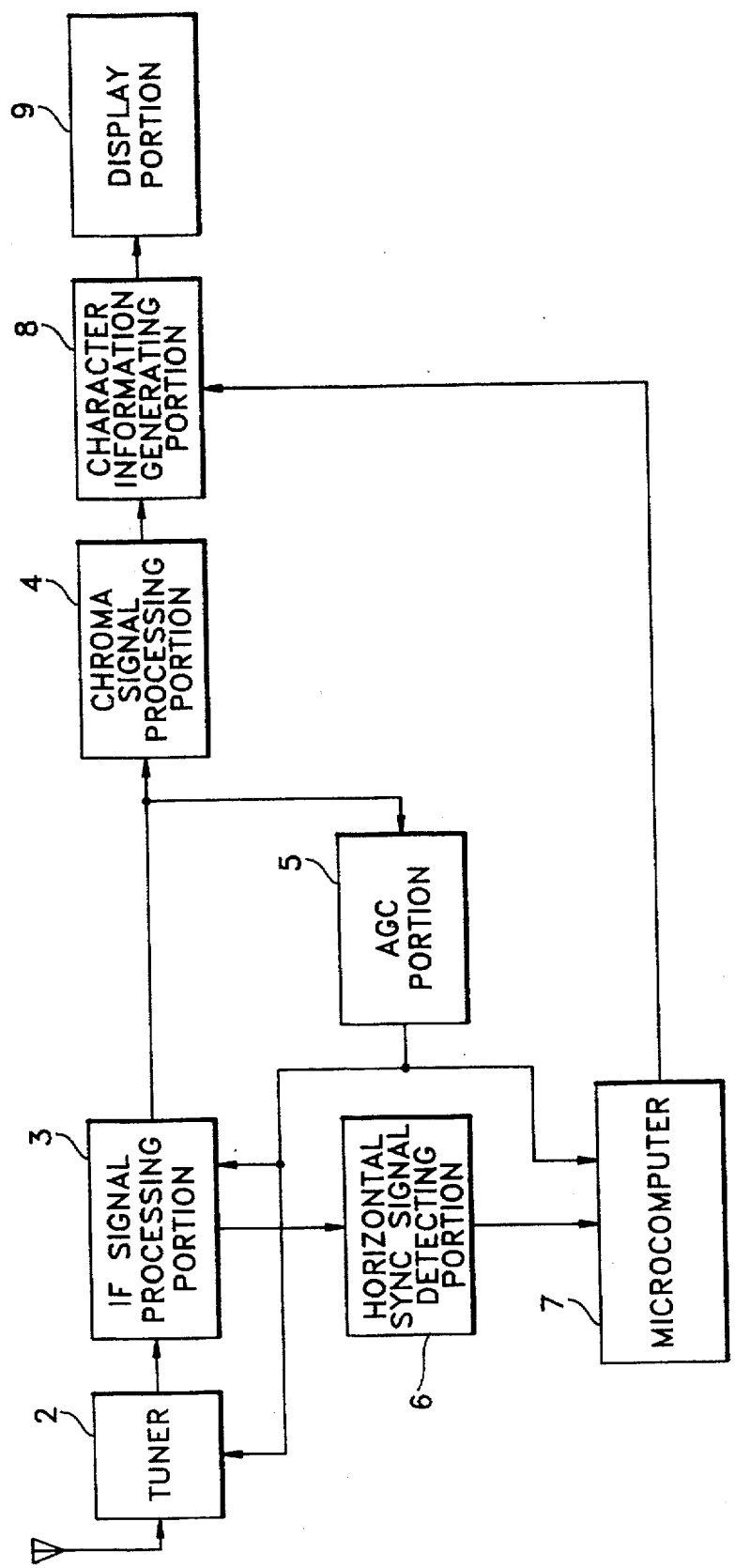
FIG. 1 is a block diagram of a broadcast state self-diagnostic apparatus according to one embodiment of the present invention.

FIG. 1 is a schematic block diagram of a broadcast state self-diagnostic apparatus of the present invention. In FIG. 1, the apparatus includes the following. A tuner 2 outputs an intermediate frequency signal (hereinafter referred to as an 'IF' signal) by tuning a radio frequency (hereinafter referred to as an 'RF' signal) broadcast signal received through antenna 1 as a desired broadcast channel signal.

An IF signal processing portion 3 detects a video signal from the IF signal supplied from tuner 2. A chroma signal processing portion 4 separates the video signal supplied from IF signal processing portion 3 into color difference signals.

An automatic gain control portion 5 generates an automatic gain control signal (hereinafter referred to as an 'AGC') according to the level of the video signal supplied from IF signal processing portion 3. The AGC signal is supplied to tuner 2 and IF signal processing portion 3 as a gain control signal in order to maintain the level of the output signal of the IF signal processing portion 3 at a predetermined level. The AGC signal is supplied to a microcomputer 7 in order to diagnose the state of the received signal.

A horizontal sync signal detection portion 6 detects a horizontal sync signal from the video signal supplied from the IF signal processing portion 3.

A microcomputer 7 outputs a control signal indicating whether or not the broadcast state is abnormal, by using the horizonal sync signal and the AGC signal.

A character information generating portion 8 generates an on-screen-display (hereinafter referred to as the 'OSD') character based upon a received control signal supplied from microcomputer 7, and combines the OSD character with color difference signals supplied from chroma signal processing portion 4, so that a composite image signal is displayed on display portion 9.

FIG. 2 is an internally detailed block diagram of the micro-computer 7 shown in FIG. 1. The microcomputer 7 includes an analog/digital (hereinafter abbreviated as an A/D) converter 10 for converting the analog type AGC signal supplied from AGC portion 5 into a digital type AGC signal.

A direct current (hereinafter abbreviated as DC) voltage detector 11 detects a DC voltage of the digitized AGC signal. A counter 13 counts the number of the horizontal sync signal supplied from horizontal sync signal detection portion 6.

A discriminator 12 compares the magnitude of the DC voltage supplied from the DC voltage detector 11 with a reference DC voltage and compares the number of the horizontal sync signal supplied from the counter 13 with the number of the reference horizontal sync signal. The discriminator 12 outputs an OSD control signal (indicating that the broadcast signal is abnormal) to the character information generating portion 8 when (1) the magnitude of the DC voltage supplied from DC voltage detector 11 is smaller than the reference DC voltage, or (2) the number of the horizontal sync signals supplied from counter 13 does not coincide with the reference number for the horizontal sync signal.

An operation of the broadcast state self-diagnostic apparatus having such a composition will be explained in detail with reference to FIG. 1 and FIG. 2.

In FIG. 1, the tuner 2 amplifies the RF broadcast signal received from antenna 1, tunes the amplified signal as the signal of the desired broadcast channel, and outputs the tuned signal as the IF signal.

The IF signal processing portion 3 amplifies the IF signal supplied from tuner 2, detects only the video signal from the amplified IF signal, and supplies the detected signal to chroma signal processing portion 4, AGC portion 5 and the horizontal sync signal detecting portion 6.

The chroma signal processing portion 4 separates the video signal supplied from the IF signal processing portion 3 into the color difference signals.

In AGC portion 5, the AGC signal is generated according to the level of the video signal supplied from the IF signal processing portion 3. The AGC signal is output to tuner 2 and IF signal processing portion 3 in order to adjust the gain of the input broadcast signal. Also, the AGC signal is output to microcomputer 7. Here, the AGC portion 5 can be incorporated in IF signal processing portion 3.

On the other hand, horizontal sync signal detecting portion 6 detects only the horizontal sync from the video signal supplied from the IF signal processing portion 3, and supplies the detected signal to microcomputer 7.

The number of horizontal sync signals input in microcomputer 7 is counted by counter 13 shown in FIG. 2. For example, in the case of the NTSC broadcast system, since the number of the horizontal sync signals is 525 for one frame, the number of reference horizontal sync signals is 525. Thus, the number of horizontal sync signals counted in counter 13 is 525 in the case of a normal state. Accordingly, the result counted in counter 13 is input to discriminator 12.

On the other hand, the analog AGC signal supplied from AGC portion 5 is input to A/D converter 10 in microcomputer 7 shown in FIG. 2, and converted to a digital signal. The digitized AGC signal is detected as a DC voltage by DC voltage detector 11. Here, since the AGC signal is the signal generated according to the magnitude of the broadcast signal received through the antenna 1, the broadcast signal of a normal state has the DC voltage level of magnitude. The DC voltage level detected in DC voltage detector 11 is input to discriminator 12.

Discriminator 12 compares the magnitude of the DC voltage supplied from DC voltage detector 11 with the reference DC voltage which is the level of the predetermined set broadcast signal of the normal state, and compares the number of horizontal sync signals supplied from counter 13 with the reference horizontal sync signal.

On the other hand, in case that the broadcast signal received through antenna 1 is normal, i.e., the signal of a strong electric field, the horizontal sync signal is transmitted without loss. However, in the case of a weak signal associated with a weak electric field, one or more sync pulses of the horizontal sync signal are lost.

Accordingly, discriminator 12 judges that the broadcast state is normal if the number of the horizontal sync signal supplied from counter 13 and the number of the reference horizontal sync signal are equal, and judges that the broadcast state is abnormal if the number of the horizontal sync signal supplied from counter 12 and the number of the reference horizontal sync signal are different.

Also, discriminator 12 judges that the broadcast state is abnormal if the DC voltage level supplied from DC voltage detector 11 is less than the reference DC voltage level. Here, the fact that the DC voltage level supplied from DC voltage detector 11 is less than the reference DC voltage level represents that the broadcast signal received from antenna 1 is the signal of a weak electric field.

Here, the microcomputer 7 is the reference signal for checking the abnormality of the broadcast state and can use the level of the video signal supplied from IF signal processing portion 3 without modification instead of using the level of the AGC signal of the AGC portion 5.

After the judging process is finished, discriminator 12 outputs the OSD control signal to character information generating portion 8, to indicate that at the time of judging, at least one of two judged results is abnormal.

Here, the OSD control signal may include a color designation signal, a position designation signal, and a blanking control signal to blank the video signal with regard to the portion on which the OSD character is displayed.

The character information generating portion 8 generates the OSD character indicating that the broadcast state is abnormal by receiving the OSD control signal with regard to the diagnostic information of the broadcast state supplied from microcomputer 7, and then combining the OSD character with the signal supplied from chroma signal processing portion 4, and displaying the combined signal on display portion 9 as a composite image signal.

Accordingly, the user can see easily by the OSD information displayed on display portion 9 that the noise is generated on the screen, because the broadcast state is abnormal, not because of trouble associated with the television.

As described above, the present invention detects the AGC signal and the horizontal sync signal of the broadcast signal, and compares the number of the horizontal sync signal and the DC voltage level with each reference value respectively, so that there are advantages in that the user can easily see the cause of the noise generated on the screen by displaying on the screen the OSD character showing the abnormality of the broadcast state if the compared values are different from each other.

What is claimed:

1. A broadcast state self-diagnostic apparatus for use in an apparatus for receiving a broadcast signal comprising:

tuning means for outputting an intermediate frequency signal by tuning a broadcast signal of an externally input radio frequency to a signal of a desired broadcast channel:

first detecting means for detecting the level of a video signal from the intermediate frequency signal supplied from the tuning means;

second detecting means for detecting a horizontal sync signal from the intermediate frequency signal supplied by the tuning means;

control means for comparing the level of the detected video signal and the detected horizontal sync signal with reference values, said control means outputting a control signal based upon the compared result; and character information generating means for generating character information according to the control signal, said character information generating means indicating tuned broadcast signal is abnormal when said radio level signal and said sync signal are below a respective reference value, and allowing for display of the generated character information; and automatic gain control signal means for generating an automatic gain control signal according to the level of said video signal for maintaining the level of said detected video signal at a uniform level and supplying said automatic gain control signal to said control means and wherein said control means compares the automatic gain control signal to a reference signal to determine whether the tuned signal is abnormal.

2. A broadcast state self-diagnostic apparatus according to claim 1, wherein said control means further comprises:

means for counting a number of pulses associated with said detected horizontal sync signal;

means for converting said generated automatic gain control signal into a digital signal;

means for detecting the level of the converted digital automatic gain control signal; and discriminating means for generating said control signal to indicate whether or not the broadcast state is normal by comparing the number of pulses the horizontal sync signal supplied from said counting means with a number of pulses associated with a reference horizontal sync signal, and comparing the level of the automatic gain control signal supplied from said level detecting means with a reference automatic gain control signal level.

3. A broadcast state self diagnostic method for diagnosing a state of a broadcast signal by tuning an externally supplied broadcast signal, and receiving a video signal of a desired channel, said method comprising the steps of:

detecting a horizontal sync signal from said video signal;

comparing the number of pulses associated with said detected horizontal sync signal with the number of pulses associated with a reference horizontal sync signal;

detecting the level of said video signal;

comparing said detected video level with a reference level;

generating a control signal if the result from either of said comparisons indicates a difference;

generating character information showing an abnormal state of the broadcast signal based upon said control signal, and displaying said generated character information;

wherein said video signal level detecting the step further comprises:

generating an automatic gain control signal based upon the level of said video signal in order to maintain the level of said video signal at a uniform amount; and detecting a direct current level of said automatic gain control signal.

4. A broadcast state self-diagnostic method for diagnosing a state of a broadcast signal that includes tuning an externally applied broadcast signal and generating an intermediate frequency video signal therefrom, said method further comprising:

detecting both a horizontal sync signal and an automatic gain control signal from said video signal;

comparing both said detected horizontal sync signal and said automatic gain control signal with respective reference signals associated therewith;

providing a control signal based upon said comparison to control generation of character information, said character information indicating whether or not said broadcast state is abnormal.

5. A broadcast state self-diagnostic apparatus for use in an apparatus for receiving a broadcast signal comprising:

tuning means for outputting an intermediate frequency signal by tuning a broadcast signal of an externally input radio frequency to a signal of a desired broadcast channel;

first detecting means for detecting the level of a video signal from the intermediate frequency signal supplied from the tuning means;

second detecting means for detecting a horizontal sync signal from the intermediate frequency signal supplied from the tuning means;

control means for comparing at least one of: the level of the detected video signal and the detected horizontal sync signal with one or more reference values, said control means outputting a control signal based upon the compared result; and character information generating means for generating character information according to the control signal, said character information generating means indicating tuned broadcast signal is abnormal when at least one of said radio level signal and said sync signal is below a respective reference value, and allowing for display of the generated character information; and automatic gain control signal means for generating an automatic gain control signal according to the level of said video signal for maintaining the level of said detected video signal at a uniform level and supplying said automatic gain control signal to said control means, and wherein said control means compares the automatic gain control signal to a reference value and determines that the tuned signal is abnormal when at least one of said radio level, sync signal, and automatic gain control is below their respective reference values.

6. A broadcast state self-diagnostic apparatus according to claim 5, wherein said control means further comprising:

Means for counting a number of pulses associated with said detected horizontal sync signal;

means for converting said generated automatic gain control signal into a digital signal;

means for detecting the level of the converted digital automatic gain control signal; and discriminating means for generating said control signal to indicate whether or not the broadcast state is normal by comparing the number of pulses the horizontal sync signal supplied from said counting means with a number of pulses associated with a reference horizontal sync signal, and comparing the level of the automatic gain control signal supplied from said level detecting means with a reference automatic gain control signal level.

* * * * *